United States Patent
Scales et al.

(10) Patent No.: US 9,733,669 B1
(45) Date of Patent: Aug. 15, 2017

(54) CASE FOR ELECTRONIC DEVICE HAVING MAGNETIC ELEMENTS FOR CONNECTION WITH EXTERNAL MAGNETIC ELEMENTS

(71) Applicant: Apple Inc., Cupertino, CA (US)

(72) Inventors: Timothy W. Scales, San Francisco, CA (US); William M. Peters, San Jose, CA (US); Edward W. Wong, San Jose, CA (US); Zhiqiang Jin, San Jose, CA (US); James A. Stryker, Mountain View, CA (US); Yoonhoo Jo, San Francisco, CA (US); David F. Mallard, Mill Valley, CA (US); Colin M. Wang, Toronto (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/043,471

(22) Filed: Feb. 12, 2016

(51) Int. Cl.
*G06F 1/16* (2006.01)

(52) U.S. Cl.
CPC .................................. *G06F 1/1633* (2013.01)

(58) Field of Classification Search
CPC .... G06F 1/1626; G06F 1/1633; G06F 1/1643; G06F 1/1656; G06F 1/166
See application file for complete search history.

(56) References Cited

U.S. PATENT DOCUMENTS

| | | | |
|---|---|---|---|
| 8,599,542 B1 | 12/2013 | Healey et al. | |
| 8,705,229 B2 | 4/2014 | Ashcraft et al. | |
| 8,807,333 B1 | 8/2014 | Cooper et al. | |
| 9,215,303 B2* | 12/2015 | Nyholm | A45C 11/00 |
| 2011/0284420 A1* | 11/2011 | Sajid | G06F 1/1628 206/576 |
| 2012/0268891 A1* | 10/2012 | Cencioni | G06F 1/1626 361/679.55 |
| 2012/0322518 A1* | 12/2012 | Kim | H04M 1/04 455/575.8 |
| 2013/0328825 A1* | 12/2013 | Brown | G06F 3/01 345/174 |
| 2014/0036438 A1* | 2/2014 | Gioscia | G06F 1/1628 361/679.55 |
| 2014/0043741 A1* | 2/2014 | Smith | G06F 1/16 361/679.3 |
| 2014/0139989 A1 | 5/2014 | Mori et al. | |
| 2014/0146455 A1* | 5/2014 | Abdelsamie | G06F 1/1628 361/679.02 |
| 2014/0185220 A1* | 7/2014 | Whitt, III | G06F 1/1669 361/679.17 |

(Continued)

*Primary Examiner* — Anthony Q Edwards
(74) *Attorney, Agent, or Firm* — Downey Brand LLP (57) ABSTRACT

A case for a portable electronic device, the portable electronic device having a housing that carries a first magnetic element capable of forming a first magnetic circuit through the housing with a magnetic element external to the portable electronic device capable of securing together the housing and the external magnetic element. The case can include a body having a bottom wall and side walls that combine to define a recessed region suitable for retaining the portable electronic device and a second magnetic element located at a position corresponding to the external magnetic element such that when the portable electronic device is carried in the recessed region, the second magnetic element forms a second magnetic circuit through the body with the external magnetic element that is capable of securing together the case and the external magnetic element.

16 Claims, 7 Drawing Sheets

(56) References Cited

U.S. PATENT DOCUMENTS

| | | | |
|---|---|---|---|
| 2014/0202891 A1* | 7/2014 | Piatt | A45C 13/34 |
| | | | 206/45.24 |
| 2014/0219626 A1 | 8/2014 | Weber | |
| 2015/0049426 A1* | 2/2015 | Smith | A45C 11/00 |
| | | | 361/679.27 |
| 2015/0055284 A1* | 2/2015 | Han | G06F 1/1616 |
| | | | 361/679.12 |
| 2015/0119118 A1* | 4/2015 | Ashley | H04M 1/04 |
| | | | 455/575.8 |
| 2015/0154935 A1* | 6/2015 | Won | G09G 5/006 |
| | | | 345/156 |
| 2015/0194998 A1* | 7/2015 | Fathollahi | H04B 1/3888 |
| | | | 455/575.8 |
| 2015/0277508 A1* | 10/2015 | McCracken | G06F 1/1626 |
| | | | 361/679.3 |
| 2016/0179247 A1* | 6/2016 | Blondin | G06F 1/1626 |
| | | | 345/174 |

* cited by examiner

CASE FOR ELECTRONIC DEVICE HAVING MAGNETIC ELEMENTS FOR CONNECTION WITH EXTERNAL MAGNETIC ELEMENTS

FIELD

The following description relates to an electronic device. In particular, the following description relates to protective cases for portable electronic devices.

BACKGROUND

As advancements are made in the field of consumer electronic devices, development of associated accessory units also occurs. Some accessory units, such as cases, are designed to protect consumer electronic devices. These improvements in accessory units can help to provide consumer electronic devices with increased functionality and greater user experience. While existing cases may function suitably for their intended purposes, further advancements may be desirable to enhance the usability and convenience of such cases.

SUMMARY

Some embodiments can include a case for a portable electronic device, the portable electronic device having a housing that carries a first magnetic element capable of forming a first magnetic circuit through the housing with a magnetic element external to the portable electronic device capable of securing together the housing and the external magnetic element. The case can include a body having a bottom wall and side walls that combine to define a recessed region suitable for retaining the portable electronic device and a second magnetic element located at a position corresponding to the external magnetic element such that when the portable electronic device is carried in the recessed region, the second magnetic element forms a second magnetic circuit through the body with the external magnetic element that is capable of securing together the case and the external magnetic element.

Some embodiments include a portable electronic device case and cover system that includes a case having a recess configured to carry a portable electronic device, the case including a first magnetic element. The system can also include a cover magnetically coupleable to the portable electronic device, the cover being moveable from at least a first open position, the cover comprising a second magnetic element, where in the first open position the first magnetic element completes a magnetic circuit with the second magnetic element restraining the cover to the case in the first open position.

Some embodiments can include a method for making a case for a portable electronic device, the portable electronic device having a housing that carries a first magnetic element capable of forming a first magnetic circuit through the housing with a magnetic element external to the portable electronic device, that is capable of securing together the housing and the external magnetic element. The can include forming a case body comprising a bottom wall and side walls that combine to define a recessed region suitable for retaining the portable electronic device. The method can also include arranging a second magnetic element in the case body at a position corresponding to the external element such that when the portable electronic device is carried in the recessed portion, the second magnetic element forms the second magnetic circuit through the body with the external magnetic element that is capable of securing together the case and the external magnetic element.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments may be used, and changes may be made without departing from the spirit and scope of the described embodiments.

The following disclosure relates to accessory units, such as cases, for portable electronic devices, such as tablet computing device and smartphones among similar other devices. Cases may be employed to partially or fully encase a consumer electronic device such that the consumer electronic device is protected from damage. Some cases work in coordination with other accessory units such as covers that are configurable during use to cover a display, act as a stand to prop up the electronic devices, or be wrapped and stowed conveniently behind the device during use of the device. The protective cover can take the form of a foldable cover that can be detachably connected to, for example, a tablet computer, and have a foldable protective flap. As stated, such a protective cover can be moveable between multiple configurations, including one configuration in which it functions as a cover and another configuration in which it functions as a stand.

The protective cover can have magnetic elements arranged in various locations that can coordinate with magnetic elements in an electronic device. For example the electronic device can have magnets arranged along an edge. The protective cover can have corresponding magnets arranged along an edge that aligns with the edge of the electronic device in a closed position. The magnets can create a magnetic circuit to hold the protective cover closed on the electronic device. The magnets can also work in conjunction with a hall effect sensor, for example, connected with a processor and can be used to detect when the cover is in a closed position or open position. The device can optionally be turned on when the cover is in the open position and turned off when the cover is in the closed position. The magnets can also be configured so that when the cover is open and wrapped around to stow along the back side of the electronic device, the magnets in the cover can again coordinate with magnets in the electronic device and hold the cover against the back side of the device.

Sometimes covers can be used without a case and magnetic elements arranged within the cover can restrain the cover to the electronic device at various connection points. For example the cover can be retained to the device using an edge attach magnet where a magnet at the edge of the cover can couple to magnets located in the edge of the electronic device. The cover can have a flexible joint adjacent the edge attach magnet allowing the cover to fold between an open position, closed position, and various positions there between. The cover can also have magnetic elements within panels making up the cover that coordinate with magnetic elements inside the electronic device to retain the cover in an open or closed position.

Covers can also be used in conjunction with a case. When a case is installed on the electronic device, the strength of the magnetic circuit between the magnetic element located in the electronic device and the magnet element located in the cover is weakened given the distance created by the existence of the case between the two magnetic elements. A weakened magnetic circuit can result in the cover not being restrained adequately and falling away from the back side of the electronic device. Strengthening the magnetic element in the electronic device is not always feasible as a magnetic element that is too strong can interfere with internal operational components of the electronic device.

Thus, embodiments can include a case having its own magnetic element located in a position to coordinate with the magnetic element of the cover, when the case is installed on the electronic device and the cover is stowed in the open position along the back side of the electronic device. Including the magnetic element in the case can make it so the magnetic element inside the portable device is not necessary and can be eliminated in some embodiments, yet the cover can still be held against the case by the magnetic circuit formed between the magnetic element in the case and the magnetic element in the cover. The magnetic element can be formed of one or more pieces that can be arranged in the case. In embodiments where there are more than one pieces making up the magnetic element, the multiple pieces can be separately located in the case or coupled together and located in the case. The multiple pieces can have similar or opposing polarities. The multiple pieces can have similar or differing shapes and sizes. In some embodiments, the magnetic elements of the case can include two magnetic pieces, each in a square shape and each having a different size. Similarly the magnetic elements in the electronic device and cover can be correspondingly square shaped and of differing sizes. By having two magnetic elements of differing sizes in the case that coordinate with corresponding magnetic elements in the electronic device and cover, the cover is retained into a more accurate and intended position without lateral shifting or slipping that can occur when only using a single piece for the magnetic element in each the case, cover and electronic device.

These and other embodiments are discussed below with reference to FIGS. 1-7. However, those skilled in the art will readily appreciate that the detailed description given herein with respect to these Figures is for explanatory purposes only and should not be construed as limiting.

Figure 1:
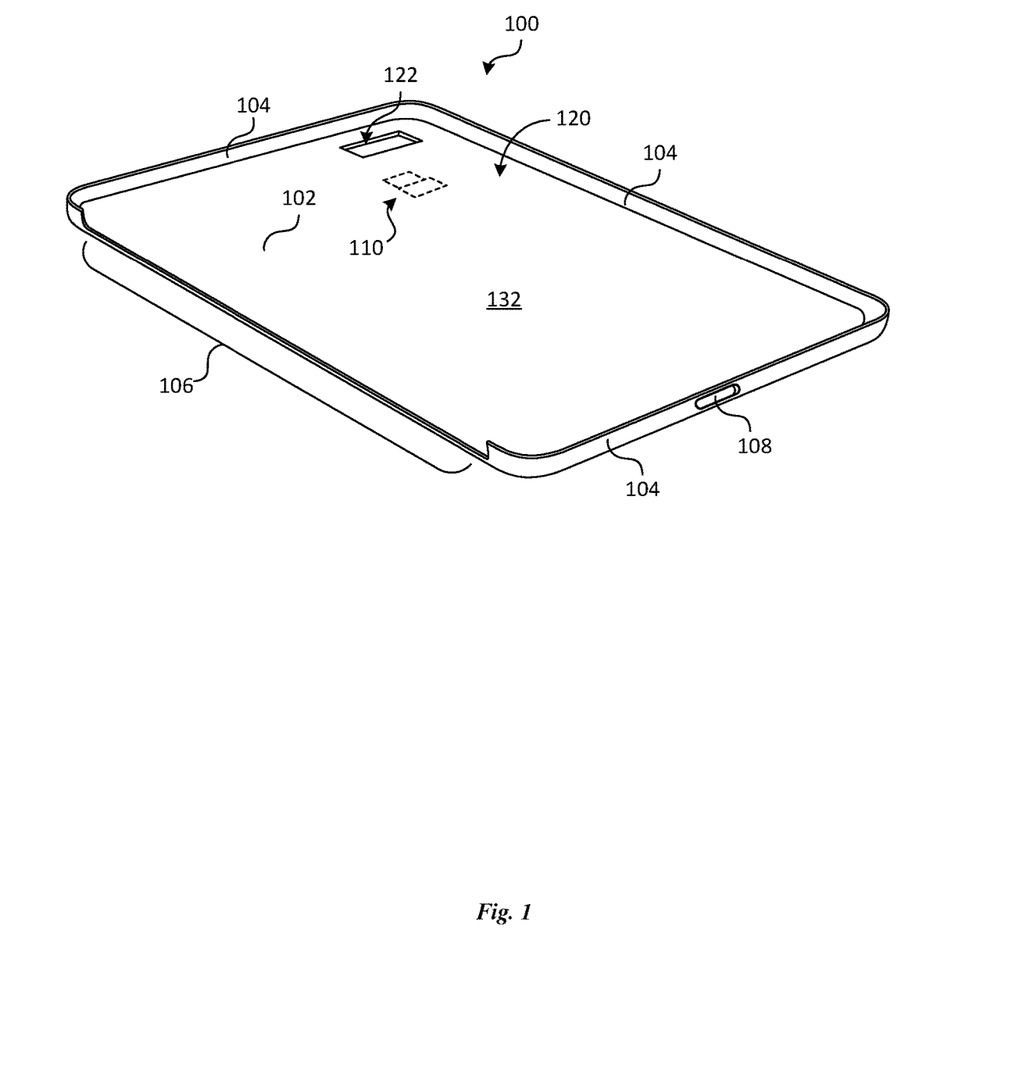
FIG. 1 illustrates a perspective view of an embodiment of a case for an electronic device, in accordance with the described embodiments.

FIG. 1 illustrates an embodiment of case 100 configured to receive an electronic device, such as a tablet computing device. Other portable computing devices can include mobile telecommunications devices (e.g., smartphones). Case 100 can include a body 132 made up from a back portion 102 and sidewalls 104. Case 100 can be made up of multiple layers including a semi rigid core (not shown) that can be made from a polycarbonate or other similar material. An outer layer can encase the semi rigid core and be made from an elastomeric material, such as silicone. When silicone is used, the silicone may be a liquid silicone rubber ("LSR"). In some embodiments, the silicone is a gum silicone, such as a heat cure rubber ("HCR"). Further, outer layer can be combined with the core by an over molding process. In other words, once the second layer is molded (or formed by another means), the second layer may be positioned in a molding tool, such as a pair of mating molds. Then, a silicone-based material is added to the molding tool such that the material flows around an exterior portion of the second layer and curves around the exterior portion. An additional protective layer can be included on the back portion 102 of case 100 and can be made of microfiber material, among other materials.

Case 100 may include apertures and protrusions, which can allow a user to operate the electronic device when positioned within case 100. For example, case 100 can include sidewall 104 having aperture 108 configured to allow access to an accessory such as a power charger or audio jack of the electronic device. Aperture 108 may be positioned on any sidewall 104 of case 100 in a location corresponding to an accessory connection point switch or button of the electronic device.

Case 100 may also optionally include aperture 122 which may be positioned to allow a camera built into an electronic device to capture an image of the environment surrounding the electronic device. Similar to the protrusions and other apertures previously described, aperture 122 may generally be in any position on back portion 102 that corresponds to the positioning of the camera within the electronic device such that the camera may capture an image.

Case 100 may further include clearance region 106 associated with a region of case 100 that allows access for a cover (shown in FIG. 3) having an edge attach magnet to be coupled with the electronic device when the electronic device is carried in the case. Despite clearance region 106 generally being a region free of material, sidewalls 104 retain the electronic device while also allowing for flexibility to insert and remove the electronic device. The sidewalls 104, coupled with back portion 102 and clearance region 106, define a recessed region 120 that receives the electronic device.

Figure 4A:
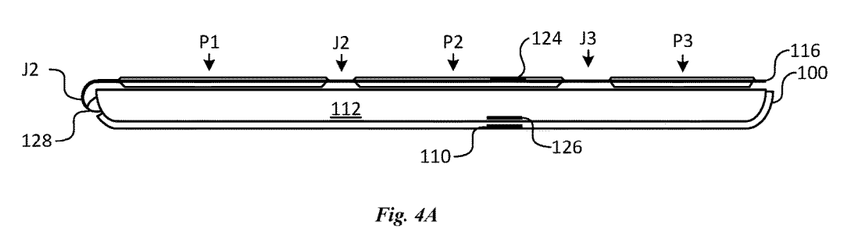
FIG. 4A illustrates a cross-sectional view of the case carrying an electronic device with a cover of FIG. 3, with the cover in the closed position in accordance with some embodiments.
Figure 4B:
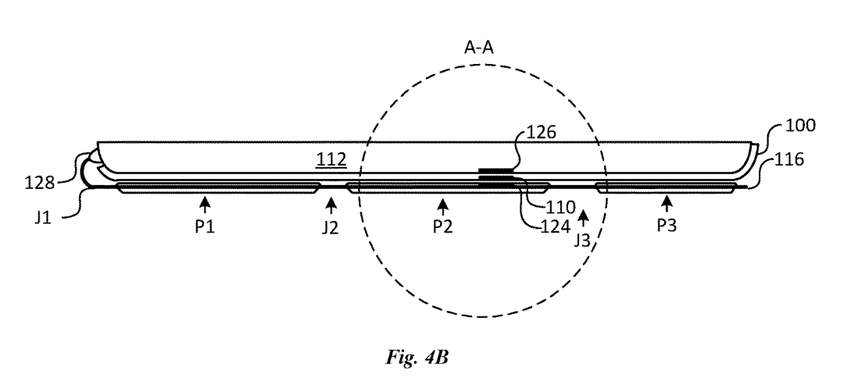
FIG. 4B illustrates a cross-sectional view of the case carrying an electronic device with a cover similar to FIG. 4B with the cover in the open position in accordance with some embodiments.
Figure 5:
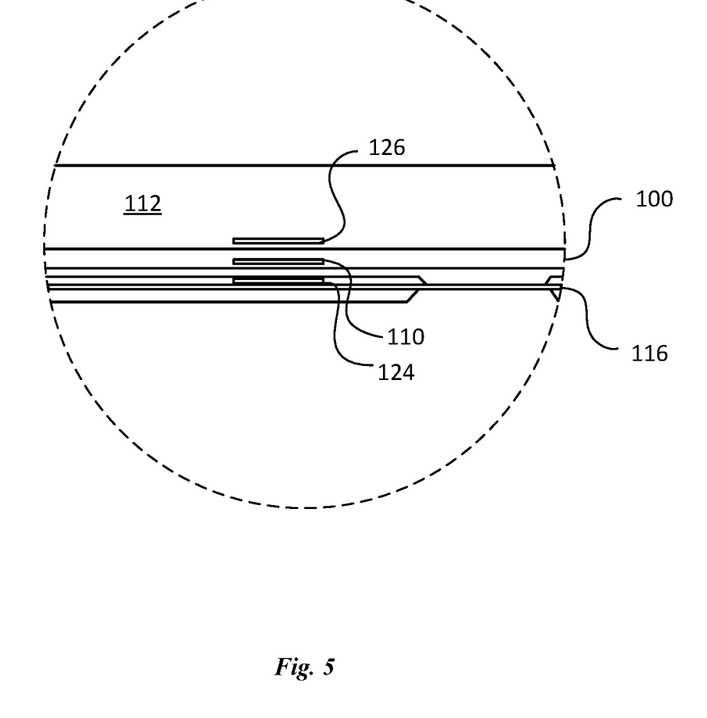
FIG. 5 illustrates a close up view of the electronic device shown in FIG. 3, showing the alignment of magnetic elements.

Case 100 can have a magnetic element 110 located in back portion 102. Magnetic elements are configured in back portion 102 in such a way that when a cover is installed magnetic element 110 aligns with corresponding magnetic elements in the cover and completes a magnetic circuit. Since the magnetic element in the cover can also align with magnetic element in the electronic device when the electronic device is not carried by the case, magnetic element 110 can generally be in any position in the back portion 102 that corresponds to the positioning of magnetic element in the housing of the electronic device. Alternatively, magnetic element 110 can be located at a location separate from corresponding magnetic elements so long as when the cover is installed a magnetic circuit can be completed by magnetic element 110 and a magnetic element of the cover. FIGS. 4A, 4B and 5, illustrate an embodiment of the alignment of magnetic element 110 and the respective magnetic elements of the cover and electronic device in greater detail.

Figure 2:
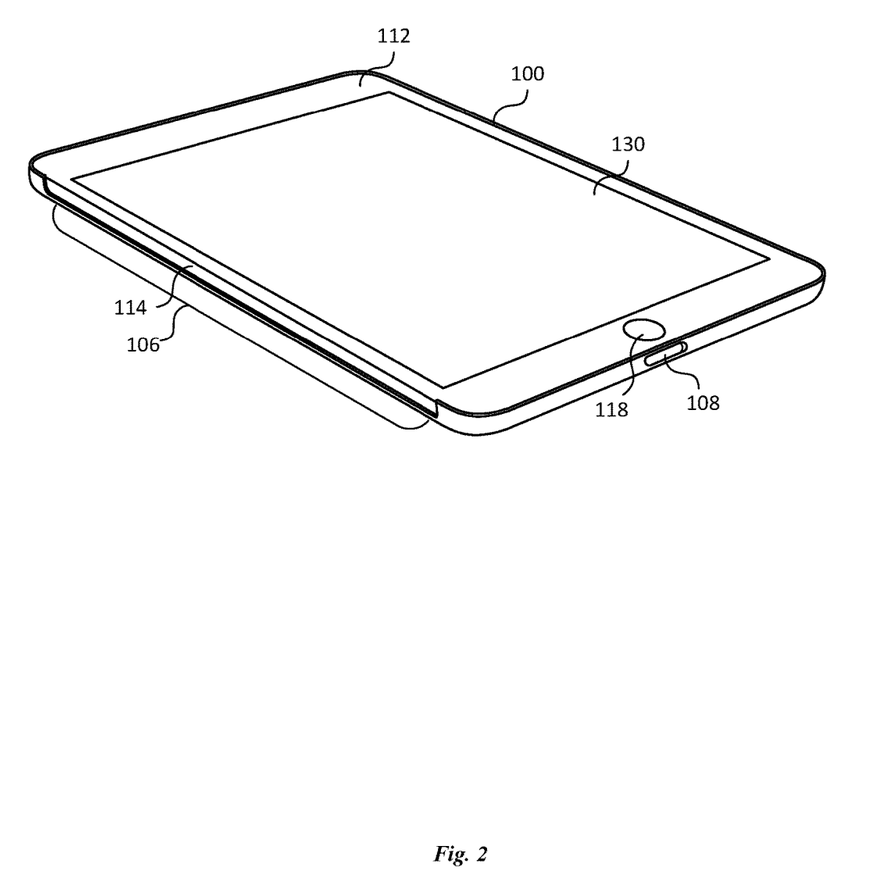
FIG. 2 illustrates a perspective view of an embodiment of a case carrying an electronic device, in accordance with the described embodiments.

FIG. 2 illustrates case 100 carrying an electronic device 112. Electronic device 112 can have a display 130 on a front side and sidewalls making up a housing 114. Display 130 can be a touch sensitive interactive display for displaying content as well as receiving input for control of applications and the content displayed on display 130. Electronic device 112 can also include an input button 118, for further providing input for controlling operations of the electronic device 112, such as applications, the operating system and so on. As can be seen, electronic device 112 can be carried in case 100 with electronic device 112 situated in the recessed region 120 (shown in FIG. 1) and with sidewalls 104 capturing the sides of electronic device 112. As can also be seen, clearance region 106 in sidewall 104 allows for a side portion of electronic device 112 to be exposed for attachment of a magnetically attachable cover as is shown in FIG. 3.

Figure 3:
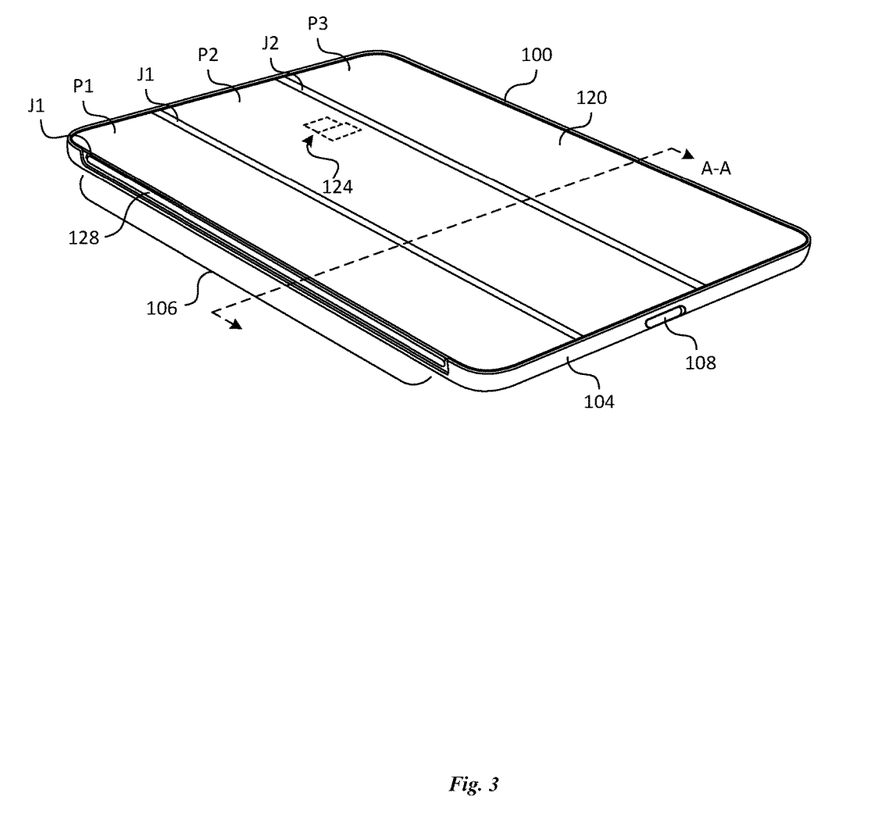
FIG. 3 illustrates a perspective view of an embodiment of a case carrying an electronic device with a cover, in accordance with the described embodiments.

In this way, FIG. 3 illustrates electronic device 112 installed in case 100 and having a cover 116. Cover 116 can be attached the side of electronic device 112 in the clearance region 106, by way of an edge attach portion 128 that is configured to fit within clearance region 106 and connect cover 116 to electronic device 112. Edge attach magnets in edge attach portion 128 can hold cover 116 to the electronic device by the magnetic force of corresponding magnetic elements in housing 114 of electronic device 112 to complete a magnetic circuit.

Cover 116 can be made up of multiple panels that are connected by joints, with the panels being foldable into various configurations and back onto each other. Cover 116, as illustrated, has three panels, P1, P2 and P3, connected to each by way of two joints J1 and J2. An additional joint J3 can connect panel P1 to edge attach portion 128. Cover 116 can include magnetic elements 124 that are configured to correspond and form a magnetic circuit with magnetic element 110 of case 100 when cover 116 is folded around and stowed along the back side of electronic device 112 and case 100. In some embodiments magnetic element 124 is located in panel P2. By Arranging magnetic element in panel P2, panel P2 is restrained against case 100, when cover 116 is stowed against the back of electronic device 112. Additional magnetic elements (not shown) can also be arranged with panel P3 to coordinate with magnetic elements in electronic device 112 to hold panel P3 against the backside of electronic device 112. In this way, both panel P2 and P3 are restrained against the backside of electronic device 112, preventing any of the panels P1, P2 or P3 from sagging or falling away from the backside of the electronic device, unintentionally.

Figure 4C:
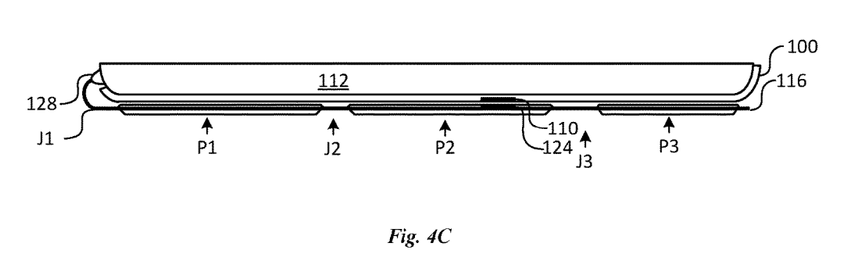
FIG. 4C illustrates a cross-sectional view of the case carrying an electronic device with a cover similar to FIG. 4B with the cover in the open position without an internal magnetic element in accordance with some embodiments.

FIG. 4A shows a cross section A-A of FIG. 3 illustrating case 100 carrying electronic device 112 with cover 116 in a closed position. FIG. 4B shows a cross section similar to A-A of FIG. 3 illustrating case 100 carrying electronic device 112 except with cover 116 in an open position. FIG. 5. Shows a close up view of a portion of FIG. 4B. As illustrated, in the closed position, magnetic element 110 is aligned with housing magnetic elements 126. In the open position, when cover 116 is stowed along the backside of electronic device 112 and against case 100, magnetic element 124 and magnetic element 110, align and coordinate. In this way, and because the polarities of the magnetic elements are configured such that magnetic element 110 and magnetic element 124 attract each other, the cover 116 is held against case 100. In some embodiments, housing magnetic element 126 need not be present as illustrated in FIG. 4C. Cover 116 can still be held against case 100 by the completion of the magnetic circuit between magnetic element 124 and magnetic element 110.

Magnetic element 110 can take the form of a single piece or can be multiple pieces. In the case of multiple pieces, the pieces can be coupled directly together, arranged adjacent to each other in back portion 102 or separated from each other. Additionally, the pieces can be of similar or differing shapes and sizes. For example, magnetic element can take the form of two similar sized square pieces. Alternatively, one piece can be a smaller square shape and a second piece can be a larger square shape. The shapes and sizes can take any number of combinations and for shapes can include circles, triangle and so on. Each of the pieces can have similar or differing polarities. Similarly, magnetic element 124 in cover 116 can have a corresponding shape and size to the shape and sizes of the pieces of magnetic element 110. This provides an accurate way of aligning the magnetic elements to each other, ensuring the cover can be retained to case 100 and back side of electronic device 112 in a precise and secure manner without lateral shifting or misalignment. Magnetic elements 110 and 124 can each be magnetized or one can be a ferrous based material that when interacting with the other magnetized magnetic element can form the necessary magnetic circuit.

Figure 6:
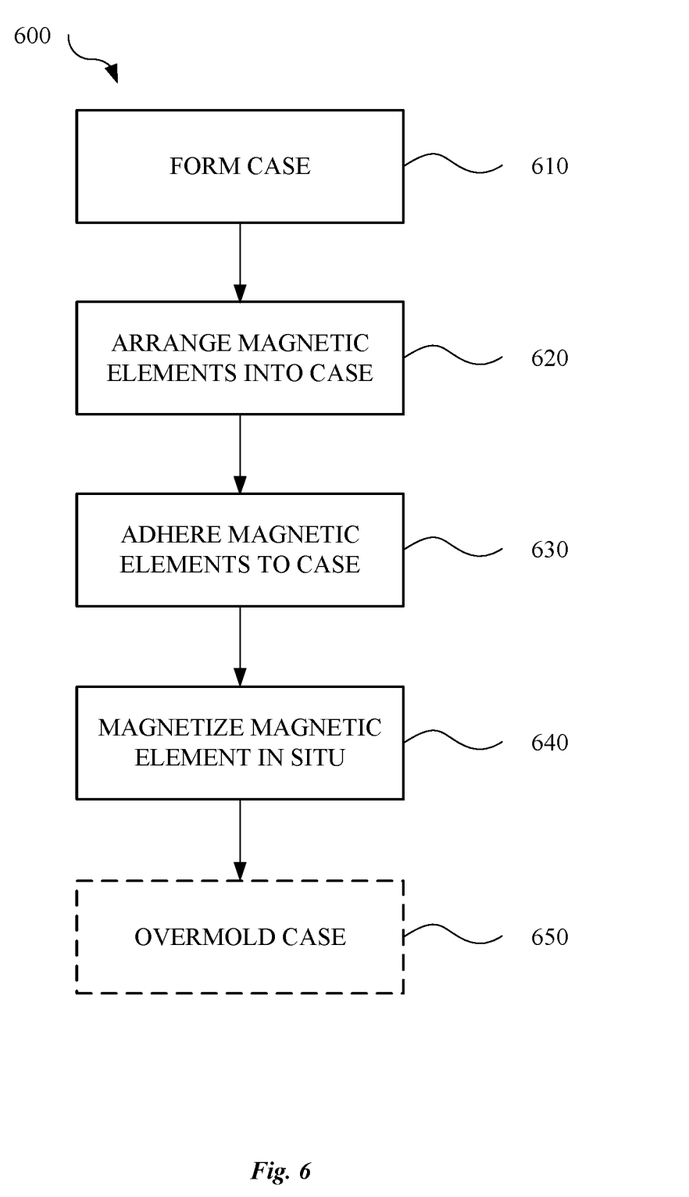
FIG. 6 is a flow chart illustrating a method for assembling a portable electronic device in accordance with many embodiments.

FIG. 6 shows a block diagram of a method for making a case in accordance with the described embodiments. In a first step 610, case 100 can be formed in a manner such that it has body 132 and recess region 120 and can carry a portable electronic device in the recess region 120. In a subsequent step 620, magnetic element 110 can be arranged in the case. In a step 630, magnetic element 110 can be adhered to case 100 in a predetermined position. Magnetic element 110 can be arranged and adhered in a core portion of case 100 that subsequently can be over molded with an outer silicone layer or can merely be coupled to the case outer layer itself. In a second step 620, the magnetic element can be magnetized to a predetermined polarity so as to create a magnetic circuit with magnetic element 126 of cover 116. In some embodiments magnetic element 110 is not magnetized, but instead can be a ferrous-based material that in the circumstance where magnetic element 126 is magnetized magnets, will form the necessary magnetic circuit. In an optional third step 630 case 100 can be over molded with an outer protective layers such as silicone to cover case 100 and hide magnetic element 110 from view.

Figure 7:
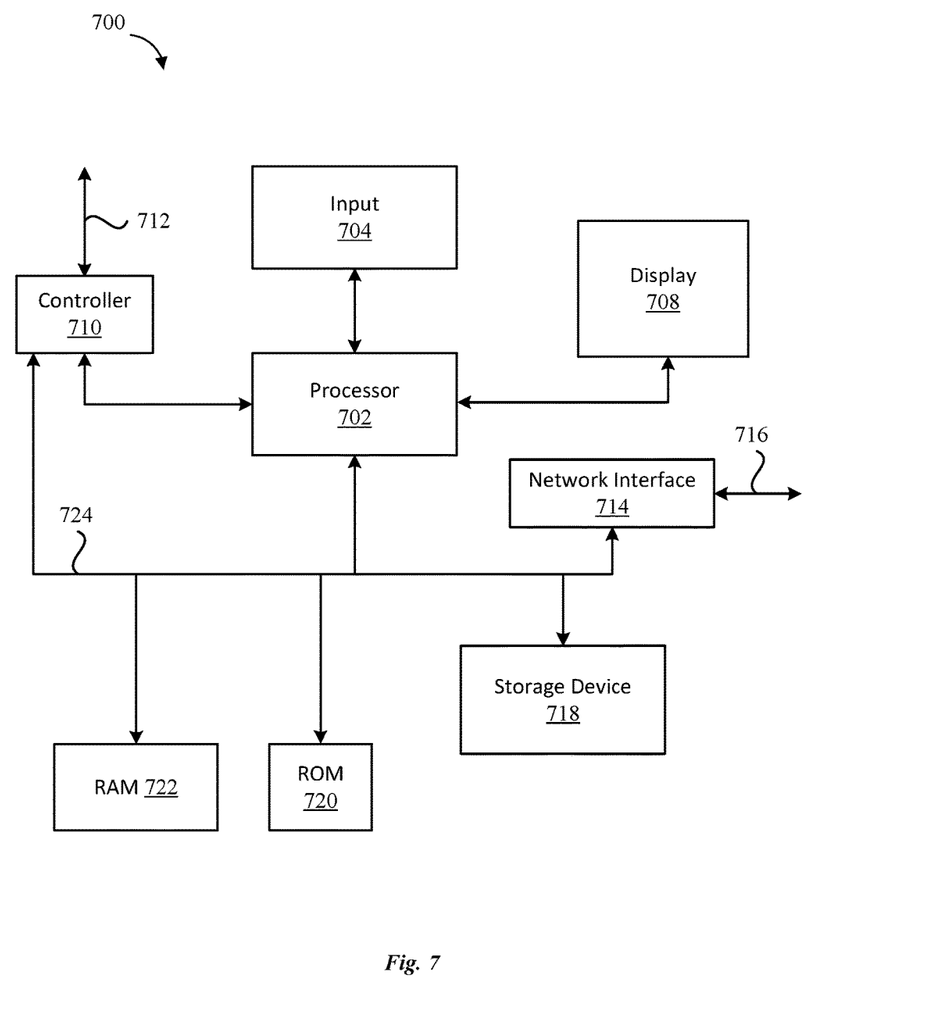
FIG. 7 is a block diagram of a computing device that can represent some of the components of the electronic device, in accordance with the described embodiments.

FIG. 7 is a block diagram of a computing device 700 that can represent some of the components of the electronic device. It will be appreciated that the components, devices or elements illustrated in and described with respect to FIG. 7 may not be mandatory and thus some may be omitted in certain embodiments. The computing device 700 can include a processor 702 that represents a microprocessor, a coprocessor, circuitry and/or a controller for controlling the overall operation of the computing device 700. Although illustrated as a single processor, it can be appreciated that the processor 702 can include a plurality of processors. The plurality of processors can be in operative communication with each other and can be collectively configured to perform one or more functionalities of the computing device 700 as described herein. In some embodiments, the processor 702 can be configured to execute instructions that can be stored at the computing device 700 and/or that can be otherwise accessible to the processor 702. As such, whether configured by hardware or by a combination of hardware and software, the processor 702 can be capable of performing operations and actions in accordance with embodiments described herein.

The computing device 700 can also include a user input device 704 that allows a user of the computing device 700 to interact with the computing device 700. For example, the user input device 704 can take a variety of forms, such as a button, keypad, dial, touch screen, audio input interface, visual/image capture input interface, input in the form of sensor data, etc. Still further, the computing device 700 can include a display 708 (screen display) that can be controlled by the processor 702 to display information to a user. A controller 710 can be used to interface with and control different equipment through an equipment control bus 712. The computing device 700 can also include a network/bus interface 714 that couples to a data link 716. The data link 716 can allow the computing device 700 to couple to a host computer or to accessory devices. The data link 716 can be provided over a wired connection or a wireless connection. In the case of a wireless connection, network/bus interface 714 can include a wireless transceiver.

The computing device 700 can also include a storage device 718, which can have a single disk or a plurality of disks (e.g., hard drives) and a storage management module that manages one or more partitions (also referred to herein as "logical volumes") within the storage device 718. In some embodiments, the storage device 718 can include flash memory, semiconductor (solid state) memory or the like. Still further, the computing device 700 can include Read-Only Memory (ROM) 720 and Random Access Memory (RAM) 722. The ROM 720 can store programs, code, instructions, utilities or processes to be executed in a non-volatile manner. The RAM 722 can provide volatile data storage, and store instructions related to components of the storage management module that are configured to carry out the various techniques described herein. The computing device 700 can further include data bus 724. The data bus 724 can facilitate data and signal transfer between at least the processor 702, the controller 710, the network/bus interface 714, the storage device 718, the ROM 720, and the RAM 722.

Various embodiments are described herein. These embodiments include at least the following. A portable electronic device, the portable electronic device having a housing that carries a first magnetic element capable of forming a magnetic circuit through the housing with a magnetic element external to the portable electronic device. The case can include a body having a bottom wall and side walls that combine to define a recessed region suitable for retaining the portable electronic device and a second magnetic element located at a position corresponding to the first magnetic element such that when the portable electronic device is carried in the recessed region, where the second magnetic element forms the magnetic circuit through the body with the external magnetic element.

In some embodiments, the second magnetic element is a magnet with a first polarity and the external magnetic element is a magnet with a second polarity. In some embodiments, the second magnetic element or the external magnetic element is a magnet with a first polarity and the corresponding magnetic element of the magnetic circuit is a ferrous based material. In some embodiments, the second magnetic element is comprised of multiple pieces. In some embodiments, the second magnetic element is comprised of two pieces. In some embodiments, the two pieces of the second magnetic element are different sizes. In some embodiments, the first and second magnetic elements are arranged in a location that prevents damage by first and second magnetic elements to internal operational components of the portable electronic device.

In some embodiments, the external magnetic element is arranged in a cover detachably connectable to the electronic device. In some embodiments, the cover comprises a plurality of panels, the plurality of panels being foldable onto each other. In some embodiments, the plurality of panels comprises a first, second middle and third panel and the second magnetic element is located in the second middle panel.

Some embodiments include a portable electronic device case and cover system that includes a case having a recess configured to carry a portable electronic device, the case including a first magnetic element. The system can also include a cover magnetically coupleable to the portable electronic device, the cover being moveable from at least a first open position, the cover comprising a second magnetic element, where in the first open position the first magnetic element completes a magnetic circuit with the second magnetic element restraining the cover to the case in the first open position.

In some embodiments, the first magnetic element comprises at least two magnets having differing polarities and the second magnetic element compromises at least two magnets having differing polarities. In some embodiments, the cover further comprises a first, second middle and third panel that are foldable upon each other and the second magnetic element is located in the second middle panel. In some embodiments, either the second magnetic element or the external magnetic element is a magnet with a first polarity and the corresponding magnetic element of the magnetic circuit is a ferrous based material.

Some embodiments can include a method for making a case for a portable electronic device, the portable electronic device having a housing that carries a first magnetic element capable of forming a magnetic circuit through the housing with a magnetic element external to the portable electronic device. The method can include forming a case body having a bottom wall and side walls that combine to define a recessed region suitable for retaining the portable electronic device, and arranging a second magnetic element in the case body at a position such that when the portable electronic device is carried in the recessed portion, the second magnetic element forms the magnetic circuit through the body with the external magnetic element.

Some embodiments can include adhering the second magnetic element to the case. Some embodiments can include magnetizing the second magnetic element in situ. Some embodiments can include over molding the case with the magnetized second magnetic element with an outer silicon layer. In some embodiments, the second magnetic element is a magnet with a first polarity and the external magnetic element is a magnet with a second polarity. In some embodiments, the second magnetic element comprises at least two magnets having differing polarities, the two pieces having different sizes.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. A case assembly for a portable electronic device having a first magnetic element, the case assembly comprising:
   a case body having a bottom wall and side walls that combine to define a recessed region wherein the side walls assist in securing the portable electronic device within the recessed region; and
   a flap pivotally coupled to the portable electronic device and comprising a second magnetic element, wherein when the portable electronic device is secured within the recessed region, and when substantially all of an exterior surface of the flap is in contact with a rear surface of the case body in an open configuration, the first magnetic element and the second magnetic element form a magnetic circuit through the case body, the magnetic circuit securing the flap with respect to the case body.

2. The case assembly of claim 1, wherein the case body comprises a third magnetic element arranged such that when the flap is in the open configuration the first magnetic element and the third magnetic element form a second magnetic circuit that secures the flap to the case body.

3. The case assembly of claim 2, wherein the third magnetic element is a magnet and the first magnetic element of the portable electronic device is a ferromagnetic material.

4. The case assembly of claim 2, wherein the third magnetic element is comprised of at least two pieces.

5. The case assembly of claim 2, wherein the second and third magnetic elements are arranged in a location that prevents damage by second and third magnetic elements to internal operational components of the portable electronic device.

6. The case assembly of claim 4, wherein the at least two pieces of the third magnetic element are of different sizes.

7. The case assembly of claim 1, wherein the second magnetic element is a magnet with a first polarity arrangement and the first magnetic element of the portable electronic device is a magnet with a second polarity arrangement that is complementary to the first polarity arrangement.

8. The case assembly of claim 1, wherein the flap comprises panels, the panels being foldable onto each other.

9. The case assembly of claim 8, wherein the panels comprise a first, second middle and third panel and the first magnetic element is located in the second middle panel.

10. A portable electronic device cover comprising:
    a magnetic attachment mechanism; and
    a single piece flap attached to the magnetic attachment mechanism, the single piece flap carrying a magnet, wherein when the magnetic attachment mechanism magnetically attaches to a portable electronic device having a processor in communication with a magnetic sensor, and the single piece flap is in an open configuration where the single piece flap is positioned with respect to the portable electronic device such that substantially all of an exterior surface of the flap is in contact with a rear surface of the portable electronic device, the sensor is capable of detecting the magnet and providing a detection signal to the processor that, in turn, alters an operation of the portable electronic device.

11. The portable electronic device cover of claim 10, wherein the magnet carried by the flap is configured to cooperate with a magnetic element arranged in a case secured to the portable electronic device to complete a magnetic circuit that restrains substantially all of the exterior surface of the cover to the case in the open configuration.

12. The portable electronic device cover of claim 11, wherein the magnet carried by the flap comprises at least two magnets having different sizes.

13. The portable electronic device cover of claim 11, wherein the magnet carried by the flap comprises at least two magnets having different shapes.

14. The portable electronic device cover of claim 10, wherein the portable electronic device further comprises an internal magnet and wherein the magnet carried by the flap coordinates with the internal magnet to restrain the flap against the portable electronic device in the open configuration.

15. The portable electronic device cover of claim 10, wherein the cover further comprises a first, second middle and third panel that are foldable upon each other and the magnet is located in the second middle panel.

16. The portable electronic device cover of claim 10, wherein the signal provided to the processor is used to turn the portable electronic device on.

* * * * *